(12) United States Patent
Hesse et al.

(10) Patent No.: US 7,673,895 B1
(45) Date of Patent: Mar. 9, 2010

(54) UNIVERSAL GOOSENECK TO FIFTH WHEEL HITCH CONVERTER

(75) Inventors: Jay Hesse, Pender, NE (US); Kevin Robert Fendrick, Pender, NE (US); Anthony S. Crippen, Pender, NE (US)

(73) Assignee: Automatic Manufacturing Equipment Company, Pender, NE (US)

( * ) Notice: Subject to any disclaimer, the term of this patent is extended or adjusted under 35 U.S.C. 154(b) by 249 days.

(21) Appl. No.: 12/074,205

(22) Filed: Mar. 3, 2008

(51) Int. Cl.
*B62D 1/07* (2006.01)
(52) U.S. Cl. ............... 280/417.1; 280/418.1; 280/441.1
(58) Field of Classification Search ............. 280/416.1, 280/417.1, 418.1, 433, 438.1, 441.1, 441.2
See application file for complete search history.

(56) References Cited

U.S. PATENT DOCUMENTS

| | | |
|---|---|---|
| 4,213,590 A | 7/1980 | VanDyke |
| 4,333,666 A | 6/1982 | Hammonds |
| 4,832,358 A | 5/1989 | Bull |
| 4,856,621 A | 8/1989 | Yoder |
| 4,921,266 A | 5/1990 | Beals |
| 5,344,172 A | 9/1994 | Jaun |
| 5,513,869 A | 5/1996 | Putnam |
| 5,516,137 A | 5/1996 | Kass et al. |
| 5,529,329 A | 6/1996 | McCoy |
| 6,024,372 A | 2/2000 | Colibert et al. |
| 6,135,482 A | 10/2000 | Larkin |
| 6,213,492 B1 * | 4/2001 | Ceccarelli, III ............ 280/491.5 |
| 6,418,073 B1 | 7/2002 | Fujita |
| 6,485,045 B1 | 11/2002 | King |
| 6,540,246 B2 | 4/2003 | Andersen et al. |
| 6,776,431 B1 | 8/2004 | Dick |
| 6,808,195 B2 | 10/2004 | Smith |
| 7,000,937 B2 | 2/2006 | Dick |
| 7,121,574 B2 | 10/2006 | Bouwkamp |
| 7,562,892 B2 * | 7/2009 | Schwalbe .................... 280/439 |

* cited by examiner

*Primary Examiner*—Kevin Hurley
(74) *Attorney, Agent, or Firm*—Donald R. Schoonover

(57) ABSTRACT

A converter apparatus for connecting a fifth wheel-type trailer to a towing vehicle having a ball hitch extending above a bed thereof, the apparatus including a horizontal first body member; a clamping mechanism releasably securing the first body member to the ball hitch; a mounting member having a horizontal second body member fixedly secured perpendicularly to and above the first body member, a pair of horizontal arm members perpendicular to and extending adjustably outwardly from opposing ends of the second body member, and a pair of horizontal arm extension members extending adjustably outwardly from opposing ends of each of the arm members; a fifth wheel hitch mechanism; and securing mechanisms releasably securing the fifth wheel hitch mechanism to the arm extension members of the arm members.

9 Claims, 3 Drawing Sheets

UNIVERSAL GOOSENECK TO FIFTH WHEEL HITCH CONVERTER

BACKGROUND OF THE INVENTION

1. Field of the Invention

The present invention relates to apparatus for towing a trailer behind a towing vehicle and, more particularly without limitation, to apparatus for towing a fifth wheel trailer behind a towing vehicle.

2. Description of the Related Art

A commonly observed need is the ability to tow a powerless vehicle, such as a trailer, behind a powered vehicle, such as an automobile, pickup or truck. Many automobiles and small trucks such as pickups have a ball hitch or square-shaped conventional receiver hitch located at the rear thereof to connect to a trailer for towing purposes. This is an acceptable arrangement where the trailer has a hitch-connecting device located at the end of a tongue extending forwardly from the front end of the trailer so articulation is provided which allows the tandemly-arranged towing vehicle/towed vehicle combination to effectively and efficiently negotiate turns during towing operations. A major drawback of this arrangement is that the magnitude of weight at which the trailer bears down on the towing vehicle hitch, sometimes referred to as the tongue weight, is limited. Since the towing vehicle hitch for this arrangement is spaced a substantial distance behind the rear axle of the towing vehicle, the lever arm of excessive tongue weight relative to the rear axle of the towing vehicle may substantially reduce the force at which the front, steering wheels of the towing vehicle bear against the ground thereby interfering with the ability to control the performance of the towing vehicle-towed vehicle combination—a very dangerous situation.

For towing arrangements for a trailer, such as a gooseneck-type trailer, where substantial tongue weight is generally involved, a ball hitch is typically mounted over, or in close proximity to, the rear axle of the towing vehicle to thereby eliminate the lever arm of the tongue weight which might otherwise seriously inhibit the ability of the towing vehicle to control the towing arrangement. The "tongue" of the gooseneck-type trailer typically has two features. First, the tongue has a first portion which extends forwardly from the trailer which allows the gooseneck-type trailer, when connected to the ball hitch of the towing vehicle, to trail far enough behind the towing vehicle such that the towing vehicle/towed vehicle combination can efficiently and effectively negotiate turns during towing operations. Second, the tongue has a second portion that extends downwardly from the forward end of the first portion that connects the gooseneck-type trailer to the ball hitch of the towing vehicle. Typically, the length of the second portion is dimensioned such that the gooseneck-type trailer will be approximately level when connected to the ball hitch of the towing vehicle. In many cases, the towing vehicle is a pickup wherein the ball hitch is mounted to the bed of the pickup and the cargo portion of the pickup has sides and a tailgate that extend substantially above the bed of the pickup. As a result, the horizontal dimensions of the second portion are minimized such that the second portion can freely pivot about the ball hitch of the towing vehicle without interference from the pickup sides and tailgate during turning operations.

For towing arrangements for a fifth wheel-type trailer having substantial tongue weight, a fifth wheel hitch is required. Since fifth-wheel trailers generally do not include the downwardly-depending second portion of a gooseneck-type trailer, hitches for fifth wheel-type trailers are typically mounted substantially above the bed of the towing vehicle in order for the fifth wheel-type trailer to clear the pickup sides and tailgate of the towing vehicle during turning operations. Such a fifth wheel hitch utilizes a substantial amount of space of the cargo area of the towing vehicle, space which could be needed for other purposes when the towing vehicle is not connected to a fifth wheel-type trailer. Preferably, the fifth wheel hitch can be installed when the towing vehicle is being used for towing a fifth wheel-type trailer and removed so the towing vehicle can be used for other purposes when the towing vehicle is not being used for towing purposes.

Also, users sometimes need to use their towing vehicle to tow a gooseneck-type trailer and other times to use the same towing vehicle to tow a fifth wheel-type trailer. A ball hitch mounted to the bed over the rear axle would suffice for towing a gooseneck-type trailer but would not provide the necessary side and tailgate clearance for towing a fifth wheel-type trailer as hereinbefore described.

What is needed is an apparatus that quickly and easily converts a ball hitch for a gooseneck-type trailer, wherein the ball hitch is mounted to the bed of a towing vehicle, to a fifth wheel hitch mounted substantially above the bed of the towing vehicle.

SUMMARY OF THE INVENTION

The improvements of the present invention for a universal gooseneck to fifth wheel hitch converter for connecting a fifth wheel-type trailer to a ball hitch of a towing vehicle, wherein the ball hitch extends above the bed of the towing vehicle for connection to a gooseneck-type trailer, include a stabilizing member, a clamping mechanism, a mounting member, a fifth wheel hitch mechanism, and securing mechanisms.

The stabilizing member includes an horizontally-oriented and elongate first body member having a first body longitudinal axis wherein the first body member is structured to receive the ball hitch therein.

The clamping mechanism is fixedly secured to the first body member and is structured to releasably secure the first body member to the ball hitch.

The mounting member includes an horizontally-oriented tubular and elongate second body member having opposing ends and a second body longitudinal axis, a spacer fixedly securing the second body member to and above the first body member with the second body longitudinal axis oriented perpendicularly to the first body longitudinal axis, and a pair of opposing, horizontally-oriented arm members wherein each arm member includes opposing ends and an arm longitudinal axis extending perpendicularly to the second body longitudinal axis. Each arm member includes a pair of opposing and horizontally-oriented arm extension members wherein each arm extension member includes a proximal end and a distal end wherein the proximal end of each arm extension member is adjustably displaceable and slidably and telescopingly receivable along the arm longitudinal axis by a respective end of a respective one of the arm members.

Each arm member includes a pair of extension adjusting mechanisms adjustably and releasably securing the proximal end of a respective arm extension member at a desired spacing horizontally outwardly from a respective end of a respective arm member wherein each extension adjusting mechanism includes a pair of third aligned orifices through a respective end of the respective arm member; a plurality of pairs of fourth aligned orifices through the proximal end of a respective arm extension member wherein each pair of fourth alignable orifices is alignable with the pair of third aligned orifices; and a push pin removably insertable through the pair of third aligned orifices and a selected pair of the fourth aligned orifices; and wherein the extension adjusting mechanisms are structured such that each arm extension member is releasably and adjustably securable a desired spacing horizontally outwardly from, and along the arm longitudinal axis of, the respective arm member.

The mounting member also includes a pair of arm adjusting mechanisms adjustably and releasably securing the arm members to a respective end of the second body member wherein each arm adjusting mechanism includes an extension member perpendicularly and centrally fixedly secured to a respective one of the arm members wherein the extension member is slidably and telescopingly receivable along the second body longitudinal axis by a respective end of the second body member; a pair of first aligned orifices through a respective end of the second body member; a plurality of pairs of second aligned orifices through the extension member wherein each pair of second aligned orifices is alignable with the pair of first aligned orifices; and a push pin removably insertable through the pair of first aligned orifices and a selected pair of the second aligned orifices; and wherein the arm adjusting mechanisms allow the arm members to be releasably and adjustably secured desired spacings horizontally outwardly from the second body member along the second body longitudinal axis.

The fifth wheel hitch mechanism includes a fifth wheel hitch mounted on four legs wherein the four legs includes a first pair of legs having distal ends with a first spacing therebetween, and a second pair of legs having distal ends with a second spacing therebetween, the distal ends of the second pair of legs having a third spacing from the distal ends of the first pair of legs.

The securing mechanisms are structured to releasably secure the fifth wheel hitch mechanism to the distal ends of the arm extension members of the arm members wherein each securing mechanism includes the distal end of each leg having a downwardly-depending protrusion with a first securing orifice therethrough, the distal end of each of the four arm extension members having a vertically-oriented slot structured and dimensioned to slidably receive a respective one of the protrusions, and a pair of aligned and horizontally-oriented second securing orifices wherein each pair of second securing orifices is alignable with a respective first securing orifice when the respective protrusion is inserted in the respective slot; and a push pin removably insertable through the respective first securing orifice and the respective pair of second securing orifices when the respective protrusion is inserted in the respective slot.

The securing mechanisms releasably secure the four legs to respective distal ends of the arm extension members of the arm members

PRINCIPAL OBJECTS AND ADVANTAGES OF THE INVENTION

The principal objects and advantages of the present invention include: providing a converter for connecting a fifth wheel-type trailer to a ball hitch of a towing vehicle wherein the ball hitch extends above the bed of the towing vehicle for connection to a gooseneck-type trailer; providing such a converter that is universally adaptable to fifth wheel hitch mechanisms, both existing and otherwise; and generally providing such a converter that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

DETAILED DESCRIPTION OF THE INVENTION

Figure 1:
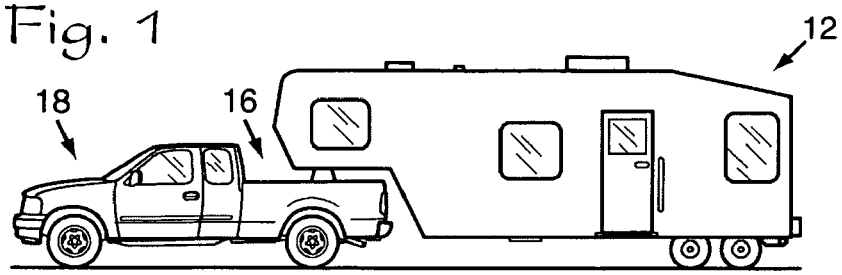
FIG. 1 is side elevational use of a universal gooseneck to fifth wheel hitch converter in use in accordance with the present invention.

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 refers generally to an universal gooseneck to fifth wheel hitch converter apparatus in accordance with the present invention, as shown in FIGS. 1 through 7, wherein the apparatus 10 is structured and configured to enable connection of a fifth wheel-type trailer 12 to a hitch 14 mounted to and extending above the bed 16 of a towing vehicle 18, the hitch 14 being structured to enable connection of a gooseneck-type trailer to the towing vehicle 18. The apparatus 10 includes a stabilizing member 21, a mounting member 23, and a fifth wheel hitch mechanism 25.

The stabilizing member 21 includes an elongate first body member 31 having a first body longitudinal axis 33. The first body longitudinal axis 33 is oriented horizontally and, preferably, transversely to a vehicle longitudinal axis 35 oriented fore-to-aft of the towing vehicle 18, as shown in FIGS. 2 and 3.

Figure 4:
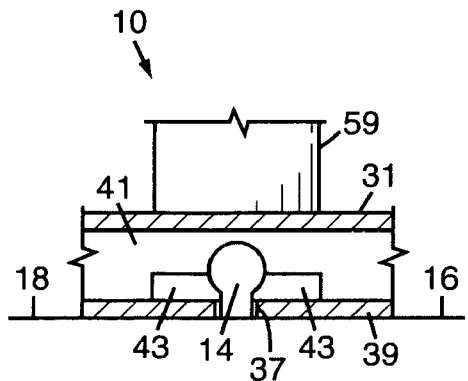
FIG. 4 is a still further enlarged, and schematic representation of a cross-sectional and fragmentary view of a clamping mechanism of the universal gooseneck to fifth wheel hitch converter.

The hitch 14 of the towing vehicle 18 for connecting to a gooseneck-type trailer generally comprises a ball hitch 14 mounted to and extending upwardly from the bed 16 of the towing vehicle 18. The first body member 31 generally includes an opening 37 in a lower wall 39 thereof. The first body member 31 is mounted to the bed 16 of the towing vehicle 18 such that the ball hitch 14 is received through the opening 37 and is contained within a cavity 41 in the first body member 31, as shown in FIG. 4.

A clamping mechanism 43 is securely mounted to the first body member 31 and is structured and configured to releasably secure the first body member 31 to the ball hitch 14 in the cavity 41. For example, the clamping mechanism 43 may include a jaw-type mechanism, such as those described in U.S. Pat. Nos. 4,213,590 and 4,333,666, which are incorporated herein by reference. It is to be understood that various mechanisms suitable for the clamping mechanism 43 that provide releasable securement to a ball-type hitch are known in the art and will not be described here in detail.

Figure 2:
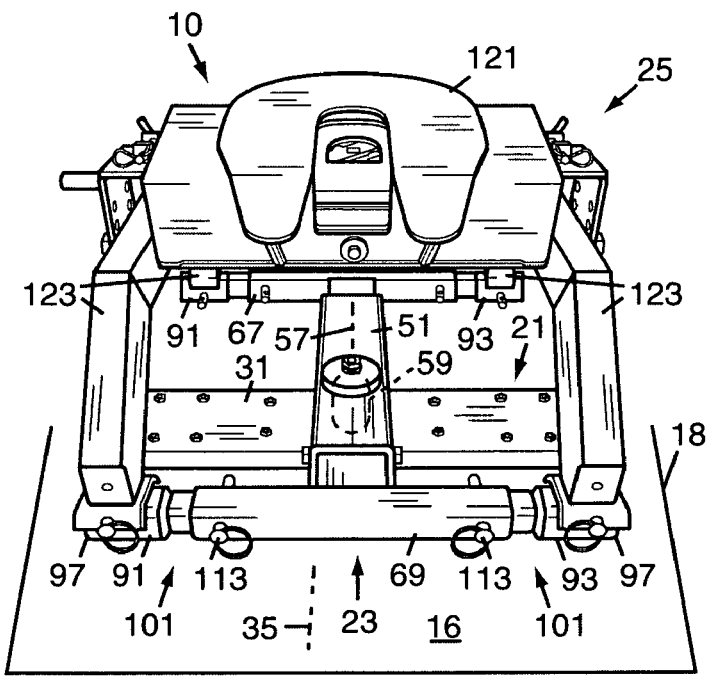
FIG. 2 is an enlarged perspective rear view of a stabilizing member, a mounting member, and a fifth wheel hitch mechanism of the universal gooseneck to fifth wheel hitch converter.
Figure 3:
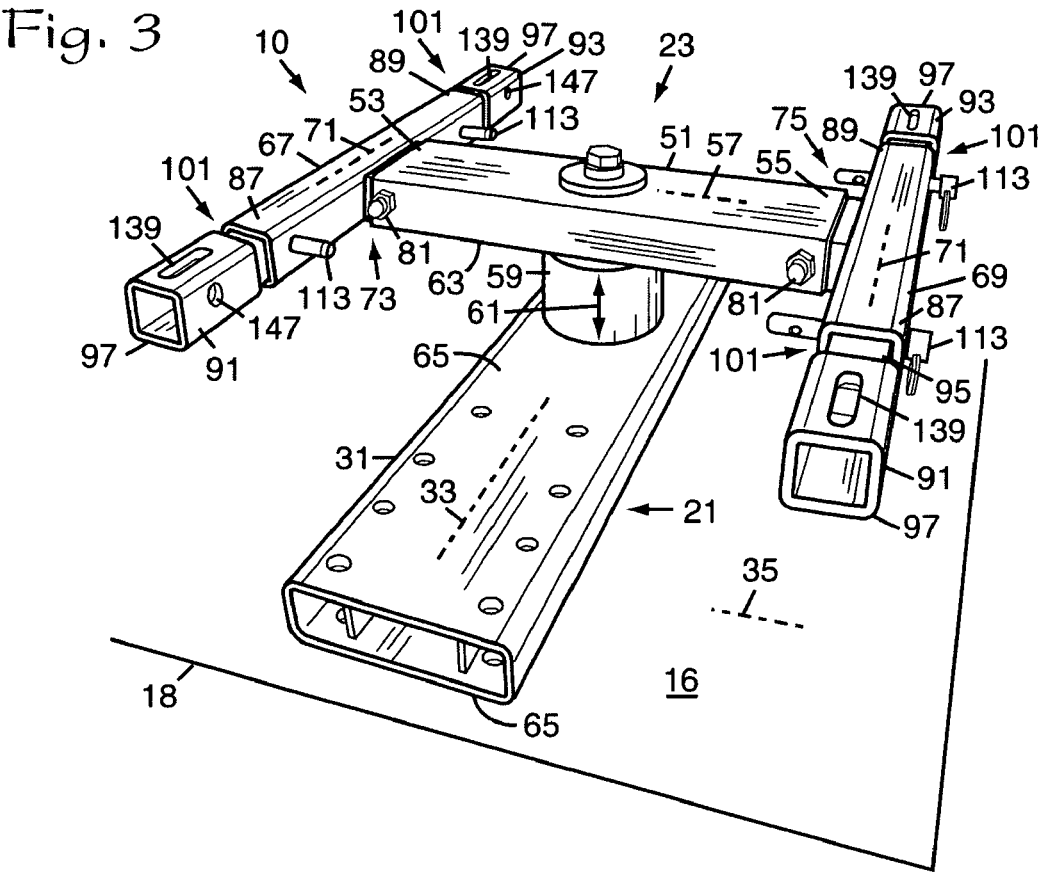
FIG. 3 is a further enlarged perspective view of the stabilizing and mounting members of the universal gooseneck to fifth wheel hitch converter.

The mounting member 23 includes an elongate, tubular second body member 51 having opposing ends 53, 55 and a second body longitudinal axis 57, as shown in FIGS. 2 and 3. A spacer 59 having a length 61 is fixedly secured to a lower surface 63 of the second body member 51 and is also fixedly secured to an upper surface 65 of the first body member 31 wherein the mounting member 23 is spaced above the stabilizing member 21 with the second body longitudinal axis 57 oriented horizontally and perpendicularly to the first body longitudinal axis 33. The length 61 of the spacer 59 is dimensioned wherein a fifth wheel-type trailer 12 connected to the ball hitch 14 as described herein will operably clear the sides and tailgate of the towing vehicle 18 during turning operations.

Figure 5:
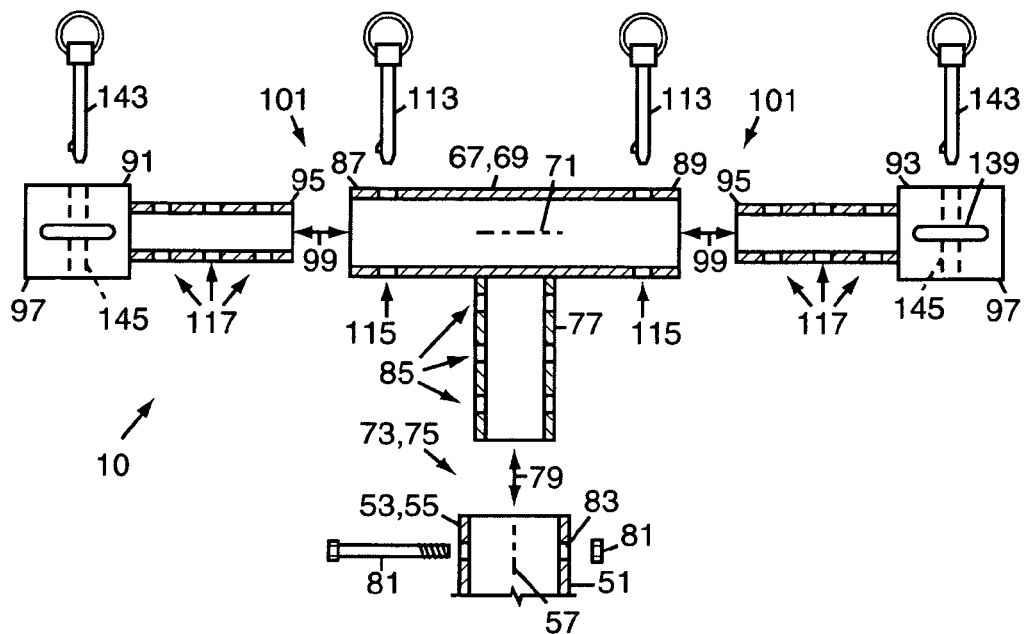
FIG. 5 is an enlarged, partially cross-sectional and fragmentary, exploded view of an arm member with arm extension members of the universal gooseneck to fifth wheel hitch converter.
Figure 7:
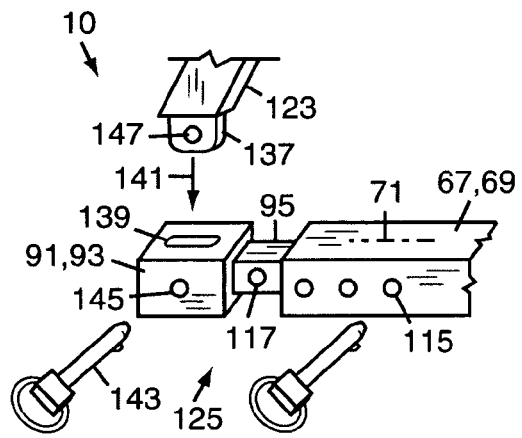
FIG. 7 is a further enlarged schematic representation of a perspective view of a securing mechanism of the universal gooseneck to fifth wheel hitch converter according to the present invention.

The mounting member 23 also includes a pair of opposing, horizontally-oriented arm members 67, 69, each arm member 67, 69 having an arm longitudinal axis 71 extending perpendicularly to the second body longitudinal axis 57. A pair of arm adjusting mechanisms 73, 75 adjustably and releasably secure the arm members 67, 69 to a respective end 53, 55 of the second body member 51. Each arm adjusting mechanism 73, 75 includes the respective arm member 67, 69 having a perpendicularly and centrally fixedly secured extension element 77, as shown in FIG. 5. Each extension element 77 is dimensioned to be slidably and telescopingly receivable along the second body longitudinal axis 57 by a respective end 53, 55 of the second body member 51, as indicated by the arrow designated by numeral 79 in FIG. 5. Each arm adjusting mechanism 73, 75 releasably and adjustably secures the respective arm member 67, 69 at a desired spacing horizontally outwardly from the second body member 51. For example, fasteners, such as push pins, bolts and nuts 81, or other suitable fasteners, inserted through a pair of first aligned orifices 83 through a respective end 53, 55 of the second body member 51 and through a selected one of a plurality of pairs of second aligned orifices 85 through each of the extension elements 77, as shown in FIG. 5.

Each arm member 67, 69 includes opposing ends 87, 89 and a pair of opposing and horizontally-oriented arm extension members 91, 93, each arm extension member 91, 93 having a proximal end 95 and a distal end 97. The proximal end 95 of each arm extension member 91, 93 is dimensioned to be slidably and telescopingly receivable along the respective arm longitudinal axis 71 by a respective end 87, 89 of a respective one of the arm members 67, 69, as indicated by arrows designated by numeral 99 in FIG. 5. Two pairs of extension adjusting mechanisms 101 are structured to releasably and adjustably secure the proximal ends 95 of respective arm extension members 91, 93 of each arm member 67, 69 at desired spacings horizontally outwardly from respective ends 87, 89 of the arm members 67, 69 along the respective arm longitudinal axis 71 of the arm members 67, 69.

For example, the extension adjusting mechanisms 101 may include fasteners, such as push pins 113, bolts and nuts, or other suitable fasteners, inserted through a pair of third aligned orifices 115 through the ends 87, 89 of respective arm members 67, 69 and a selected pair of a plurality of pairs of fourth aligned orifices 117 through the respective proximal end 95 of a respective arm extension member 91, 93, each pair of fourth aligned orifices 117 being alignable with the pair of third aligned orifices 115, as similarly described for the arm adjusting mechanisms 73, 75.

Figure 6:
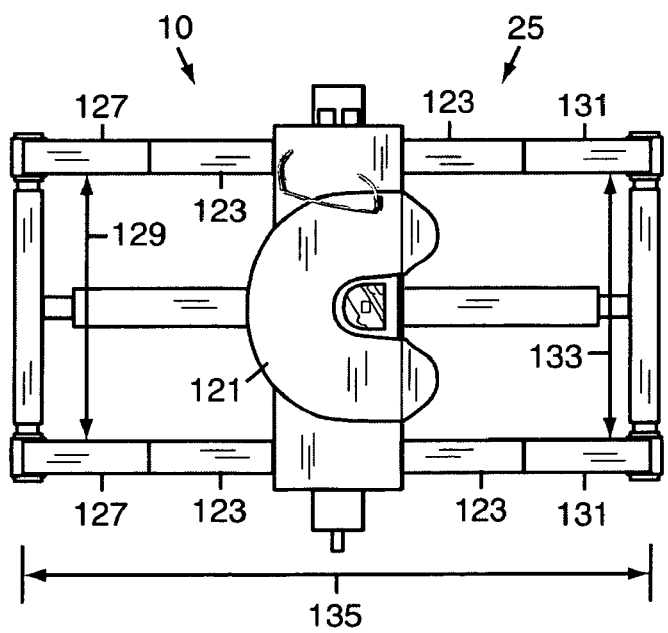
FIG. 6 is a schematic representation of a plan view of the fifth wheel hitch mechanism of the universal gooseneck to fifth wheel hitch converter.

The fifth wheel hitch mechanism 25 includes a fifth wheel hitch 121 mounted on four legs 123 and securing mechanisms 125. The four legs 123 include a first or front pair of legs 127 having distal ends with a first spacing 129 therebetween, and a second or rear pair of legs 131 having distal ends with a second spacing 133 therebetween. Preferably, the magnitude of first spacing 129 is equal to the magnitude of second spacing 133. The distal ends of the first pair of legs 127 and the distal ends of the second pair of legs 131 have a third spacing 135 therebetween as shown in FIG. 6.

The securing mechanisms 125 securely and releasably secure the four legs 123 to respective distal ends 97 of the four arm extension members 91, 93. For example, the securing mechanisms 125 may include the distal end of each leg 123 having a downwardly-depending protrusion 137 that is slidably insertable into a respective one of a vertically-oriented slot 139 formed in the distal end 97 of each of the four arm extension members 91, 93, as indicated by the arrow designated by numeral 141 in FIG. 7. Fasteners, such as push pins 143 for example, inserted through an aligned pair of orifices 145 through the proximal end 95 of a respective arm extension member 91, 93 and through an orifice 147 through a respective protrusion 137 releasably secure the legs 123 to the arm extension members 91, 93.

In an application of the present invention, the first body member 31 is placed against the bed 16 of the towing vehicle 18 such that the ball hitch 14 is received through the opening 37 of the first body member 31 with the first body member 31 oriented transversely to the fore-to-aft vehicle longitudinal axis 35 of the towing vehicle 18. The respective extension adjusting mechanisms 101 are securely adjusted wherein the distal ends 97 of the respective arm extension members 91, 93 are displaced along the arm longitudinal axis 71 of the respective arm member 67, 69 such that the spacing between the distal ends 97 of the arm extension members 91, 93 correspond with the first spacing 129 between the distal ends of the first pair of legs 127. Preferably, the spacings of those distal ends 97 relative to the second body longitudinal axis 57 are substantially equal.

Similarly, the respective extension adjusting mechanisms 101 are securely adjusted wherein the distal ends 97 of the respective arm extension members 91, 93 are displaced along the arm longitudinal axis 71 of the respective arm member 67, 69 such that the spacing between the distal ends 97 of the arm extension members 91, 93 correspond with the second spacing 133 between the distal ends of the second pair of legs 131. Preferably, the spacings of those distal ends 97 relative to the second body longitudinal axis 57 are substantially equal.

The arm adjusting mechanisms 73, 75 are securely adjusted wherein the extension elements 77 are displaced along the second body longitudinal axis 57 such that the spacing between the arm longitudinal axes 71 of the arm members 67, 69 correspond with the third spacing 135 between the distal ends of the first and second pairs of legs 127, 131. Preferably, the spacings of those arm longitudinal axes 71 relative to the spacer 59 are substantially equal.

The distal ends of the four legs 123 are then securely and releasably mounted to respective distal ends 97 of the arm extension members 91, 93. The fifth wheel hitch 121 of the fifth wheel hitch mechanism 25 is then ready for connecting a fifth wheel-type trailer 12 to the towing vehicle 18.

Based on the disclosure herein, it should be obvious to persons having ordinary skill in the relevant art that the present invention 10 is sufficiently adjustable to accommodate a multitude of four-legged fifth wheel hitch mechanisms, existing or otherwise, having a variety of spacings between the front pair of legs, between the rear pair of legs, and/or between the front and rear pairs of legs.

It is to be understood that while certain forms of the present invention have been illustrated and described herein, it is not to be limited to the specific forms or arrangement of parts as described and shown.

What is claimed and desired to be covered by Letters Patent is as follows:

1. An apparatus for connecting a fifth wheel-type trailer to a ball hitch of a towing vehicle wherein the ball hitch extends above the bed of the towing vehicle for connection to a gooseneck-type trailer, the apparatus comprising:
   (a) an horizontally-oriented and elongate first body member having a first body longitudinal axis, the first body member being structured to receive the ball hitch therein;
   (b) a clamping mechanism fixedly secured to the first body member and structured to releasably secure the first body member to the ball hitch;
   (c) a mounting member including:
      (1) an horizontally-oriented elongate and tubular second body member having opposing ends and a second body longitudinal axis wherein the second body member is fixedly secured to and above the first body member with the second body longitudinal axis oriented perpendicularly to the first body longitudinal axis,
      (2) a pair of opposing, horizontally-oriented arm members wherein each arm member includes opposing ends and an arm longitudinal axis extending perpendicularly to the second body longitudinal axis, each arm member including:
         (A) a pair of opposing and horizontally-oriented arm extension members, each having a proximal end and a distal end, the proximate end of each arm extension member being adjustably displaceable and slidably and telescopingly receivable along the arm longitudinal axis by a respective end of a respective one of the arm members, and
         (B) a pair of extension adjusting mechanisms adjustably and releasably securing the proximal end of a respective arm extension member at a desired spacing horizontally outwardly from a respective end of a respective arm member,
      (3) a pair of arm adjusting mechanisms adjustably and releasably securing the arm members to a respective end of the second body member,
      (4) a fifth wheel hitch mechanism, and
      (5) securing mechanisms structured to releasably secure the fifth wheel hitch mechanism to the distal ends of the arm extension members of the arm members.

2. An apparatus as described in claim 1, wherein each arm adjusting mechanism includes:
   (a) an extension member perpendicularly and centrally fixedly secured to a respective one of the arm members wherein the extension member is slidably and telescopingly receivable along the second body longitudinal axis by a respective end of the second body member;
   (b) a pair of first aligned orifices through a respective end of the second body member;
   (c) a plurality of pairs of second aligned orifices through the extension member, each pair of second aligned orifices being alignable with the pair of first aligned orifices; and
   (d) a fastener insertable through the pair of first aligned orifices and a selected pair of the second aligned orifices; and
   (e) wherein the arm adjusting mechanism allows the arm member to be releasably and adjustably secured a desired spacing horizontally outwardly from the second body member along the second body longitudinal axis.

3. An apparatus as described in claim 2, wherein the fastener includes a push pin.

4. An apparatus as described in claim 1, wherein each extension adjusting mechanism includes:
   (a) a pair of third aligned orifices through a respective end of the respective arm member;
   (b) a plurality of pairs of fourth aligned orifices through the proximal end of a respective arm extension member, each pair of fourth aligned orifices being alignable with the pair of third aligned orifices; and
   (c) a fastener insertable through the pair of third aligned orifices and a selected pair of the fourth aligned orifices; and
   (d) the extension adjusting mechanism being structured wherein the respective arm extension member is releasably and adjustably securable at a desired spacing horizontally outwardly from, and along the arm longitudinal axis of, the respective arm extension member.

5. An apparatus as described in claim 4, wherein the fastener includes a push pin.

6. An apparatus as described in claim 1, wherein the fifth wheel hitch mechanism comprises:
   (a) a fifth wheel hitch mounted on four legs, the four legs including:
      (1) a first pair of legs having distal ends with a first spacing therebetween, and
      (2) a second pair of legs having distal ends with a second spacing therebetween, the distal ends of the second pair of legs having a third spacing from the distal ends of the first pair of legs; and
   (b) wherein the securing mechanisms releasably secure the four legs to respective distal ends of the arm extension members of the arm members.

7. An apparatus as described in claim 6, wherein each of the securing mechanisms includes:
   (a) the distal end of each leg having a downwardly-depending protrusion having a first securing orifice therethrough;
   (b) the distal end of each of the four arm extension members including:
      (1) a vertically-oriented slot structured and dimensioned to slidably receive a respective one of the protrusions, and
      (2) a pair of aligned and horizontally-oriented second securing orifices, each pair of second securing orifices being alignable with a respective first securing orifice when the respective protrusion is inserted in the respective slot; and
   (c) a fastener removably insertable through the respective first securing orifice and the respective pair of second securing orifices when the respective protrusion is inserted in the respective slot.

8. An apparatus as described in claim 7, wherein each fastener includes a push pin.

9. An apparatus for connecting a fifth wheel-type trailer to a ball hitch of a towing vehicle wherein the ball hitch extends above the bed of the towing vehicle for connection to a gooseneck-type trailer, the apparatus comprising:
- (a) an horizontally-oriented and elongate first body member having a first body longitudinal axis, the first body member being structured to receive the ball hitch therein;
- (b) a clamping mechanism fixedly secured to the first body member and structured to releasably secure the first body member to the ball hitch;
- (c) a mounting member including:
  - (1) an horizontally-oriented tubular and elongate second body member having opposing ends and a second body longitudinal axis,
  - (2) a spacer fixedly securing the second body member to and above the first body member with the second body longitudinal axis oriented perpendicularly to the first body longitudinal axis,
  - (3) a pair of opposing, horizontally-oriented arm members wherein each arm member includes opposing ends and an arm longitudinal axis extending perpendicularly to the second body longitudinal axis, each arm member including:
    - (A) a pair of opposing and horizontally-oriented arm extension members, each having a proximal end and a distal end, the proximal end of each arm extension member being adjustably displaceable and slidably and telescopingly receivable along the arm longitudinal axis by a respective end of a respective one of the arm members,
    - (B) a pair of extension adjusting mechanisms adjustably and releasably securing the proximal end of a respective arm extension member at a desired spacing horizontally outwardly from a respective end of a respective arm member, each extension adjusting mechanism including:
      - (i) a pair of third aligned orifices through a respective end of the respective arm member,
      - (ii) a plurality of pairs of fourth aligned orifices through the proximal end of a respective arm extension member, each pair of fourth aligned orifices being alignable with the pair of third aligned orifices, and
      - (iii) a push pin removably insertable through the pair of third aligned orifices and a selected pair of the fourth aligned orifices, and
      - (iv) the extension adjusting mechanism being structured wherein the respective arm extension member is releasably and adjustably securable a desired spacing horizontally outwardly from, and along the arm longitudinal axis of, the respective arm member,
  - (4) a pair of arm adjusting mechanisms adjustably and releasably securing the arm members to a respective end of the second body member, each arm adjusting mechanism including:
    - (A) an extension member perpendicularly and centrally fixedly secured to a respective one of the arm members wherein the extension member is slidably and telescopingly receivable along the second body longitudinal axis by a respective end of the second body member,
    - (B) a pair of first aligned orifices through a respective end of the second body member,
    - (C) a plurality of pairs of second aligned orifices through the extension member, each pair of second aligned orifices being alignable with the pair of first aligned orifices, and
    - (D) a push pin removably insertable through the pair of first aligned orifices and a selected pair of the second aligned orifices, and
    - (E) wherein the arm adjusting mechanism allows the arm member to be releasably and adjustably secured a desired spacing horizontally outwardly from the second body member along the second body longitudinal axis;
- (d) a fifth wheel hitch mechanism including:
  - (1) a fifth wheel hitch mounted on four legs, the four legs including:
    - (A) a first pair of legs having distal ends with a first spacing therebetween, and
    - (B) a second pair of legs having distal ends with a second spacing therebetween, the distal ends of the second pair of legs having a third spacing from the distal ends of the first pair of legs, and
  - (2) wherein the securing mechanisms releasably secure the four legs to respective distal ends of the arm extension members of the arm members; and
- (e) securing mechanisms structured to releasably secure the fifth wheel hitch mechanism to the distal ends of the arm extension members of the arm members, each of the securing mechanisms including:
  - (1) the distal end of each leg having a downwardly-depending protrusion with a first securing orifice therethrough,
  - (2) the distal end of each of the four arm extension members having:
    - (A) a vertically-oriented slot structured and dimensioned to slidably receive a respective one of the protrusions, and
    - (B) a pair of aligned and horizontally-oriented second securing orifices, each pair of second securing orifices being alignable with a respective first securing orifice when the respective protrusion is inserted in the respective slot, and
  - (3) a push pin removably insertable through the respective first securing orifice and the respective pair of second securing orifices when the respective protrusion is inserted in the respective slot.

* * * * *